(12) United States Patent
Giencke et al.

(10) Patent No.: US 8,984,099 B1
(45) Date of Patent: Mar. 17, 2015

(54) SYSTEMS AND METHODS FOR IDENTIFYING INCREASED USER INTEREST AND PROMOTING CONTENT IN A GEOGRAPHIC INFORMATION SYSTEM

(71) Applicants: Pete Giencke, Mountain View, CA (US); Guirong Zhou, San Jose, CA (US)

(72) Inventors: Pete Giencke, Mountain View, CA (US); Guirong Zhou, San Jose, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/739,529

(22) Filed: Jan. 11, 2013

(51) Int. Cl.
*G06F 17/30* (2006.01)
*H04L 29/08* (2006.01)

(52) U.S. Cl.
CPC ........... *H04L 67/10* (2013.01); *Y10S 707/9994* (2013.01)
USPC ........... 709/219; 709/217; 709/245; 709/203; 705/14.49; 705/51; 707/999.01

(58) Field of Classification Search
CPC ....................................................... H04L 67/10
USPC ................................ 709/219, 203, 245, 217
See application file for complete search history.

(56) References Cited

U.S. PATENT DOCUMENTS

| | | | |
|---|---|---|---|
| 6,985,929 B1 * | 1/2006 | Wilson et al. | 709/217 |
| 7,457,706 B2 * | 11/2008 | Melero et al. | 702/5 |
| 7,801,888 B2 | 9/2010 | Rao et al. | |
| 7,933,897 B2 | 4/2011 | Jones et al. | |
| 7,966,638 B2 | 6/2011 | Gossweiler et al. | |
| 2005/0004903 A1 | 1/2005 | Tsuda | |
| 2013/0325903 A1 * | 12/2013 | Rohlf et al. | 707/797 |
| 2014/0108464 A1 * | 4/2014 | Rohlf et al. | 707/797 |

FOREIGN PATENT DOCUMENTS

EP 2342660 7/2011

OTHER PUBLICATIONS

Badger, "Extra! Extra! Discover the world's news in Google Earth", http://google-latlong.blogspot.com —2 pages.

* cited by examiner

*Primary Examiner* — Jude Jean Gilles
(74) *Attorney, Agent, or Firm* — Dority & Manning, P.A.

(57) ABSTRACT

Systems and methods for identifying increased user interest in a geographic area and selecting and promoting content associated with such geographic area within a geographic information system are provided. One exemplary aspect relates to a computer-implemented method of promoting an item of content within a geographic information system. The geographic information system can comprise a plurality of geospatial data objects respectively representing a plurality of geographic areas. The plurality of geospatial data objects can be accessed by one or more client devices. The method includes identifying a first geospatial data object experiencing an increased volume of access. The method further includes selecting an item of content associated with a geographic area represented by the first geospatial data object and promoting the item of content within the geographic information system. An exemplary system includes a host server system in communication with one or more client devices over a network.

22 Claims, 4 Drawing Sheets

SYSTEMS AND METHODS FOR IDENTIFYING INCREASED USER INTEREST AND PROMOTING CONTENT IN A GEOGRAPHIC INFORMATION SYSTEM

FIELD

The present disclosure relates generally to a geographic information system. More particularly, the present disclosure relates to systems and methods for identifying increased user interest in a geographic area and selecting and promoting content associated with such geographic area within a geographic information system.

BACKGROUND

Geographic information systems provide for the archiving, retrieving, and manipulating of data that has been stored and indexed according to geographic coordinates associated with such data. A geographic information system generally includes a variety of data types, including imagery, maps, tables, vector data (e.g. vector representations of roads, parcels, buildings, etc.) and other data. Improvements in computer processing power and broadband technology have led to the development of interactive geographic information systems that allow for the navigation and display of geographic imagery. For example, a user of an interactive geographic information system can input or request a geographic area of interest and, in response, the geographic information system can present geographic imagery associated with such geographic area of interest within a user interface.

Some interactive geographic information systems provide navigation controls within the user interface for navigating cities, neighborhoods, geographic areas and other terrain in two or three dimensions. The navigation controls can enable users to tilt, pan, rotate, zoom, and activate views of terrain, buildings, and other objects from different perspectives. An example of an interactive geographic information system for navigating geographic imagery is the Google Earth™ virtual globe application developed by Google Inc. Such interactive geographic information systems can be highly accessible sources of information concerning the physical or geographic attributes of a certain geographic area of interest.

However, geographic information systems often fail to provide content concerning real-world events occurring within the geographic areas represented within the geographic information system. For example, when an event happens in the real-world, a user often employs a geographic information system to learn about or explore the geographic area in which the real-world event has occurred or will occur. In this way, the user is placing an implicit value on data associated with such geographic area of interest. However, geographic information systems often do not provide location-specific content for the user to further explore or investigate and, thus, do not fully satisfy the user's underlying desire for information.

Even in geographic information systems that do provide content concerning the geographic areas represented within the geographic information system, problems arise due to the sheer volume of content available for inclusion within the geographic information system. Including all available items of content would overwhelm the user and inhibit use of the geographic information system to obtain geographic imagery. More particularly, in the instance in which a user is investigating a geographic area in response to a real-world event, certain items of content can more closely relate to the real-world event being investigated. Therefore, systems and methods for identifying increased user interest in a geographic area and selecting and promoting content associated with such geographic area within a geographic information system are desirable.

SUMMARY

Aspects and advantages of the invention will be set forth in part in the following description, or may be obvious from the description, or may be learned through practice of the invention.

One exemplary aspect of the present disclosure relates to a computer-implemented method of promoting an item of content within a geographic information system. The geographic information system can comprise a plurality of geospatial data objects respectively representing a plurality of geographic areas. The plurality of geospatial data objects can be accessed by one or more client devices. The method includes identifying a first geospatial data object experiencing an increased volume of access. The method further includes selecting an item of content associated with a geographic area represented by the first geospatial data object and promoting the item of content within the geographic information system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
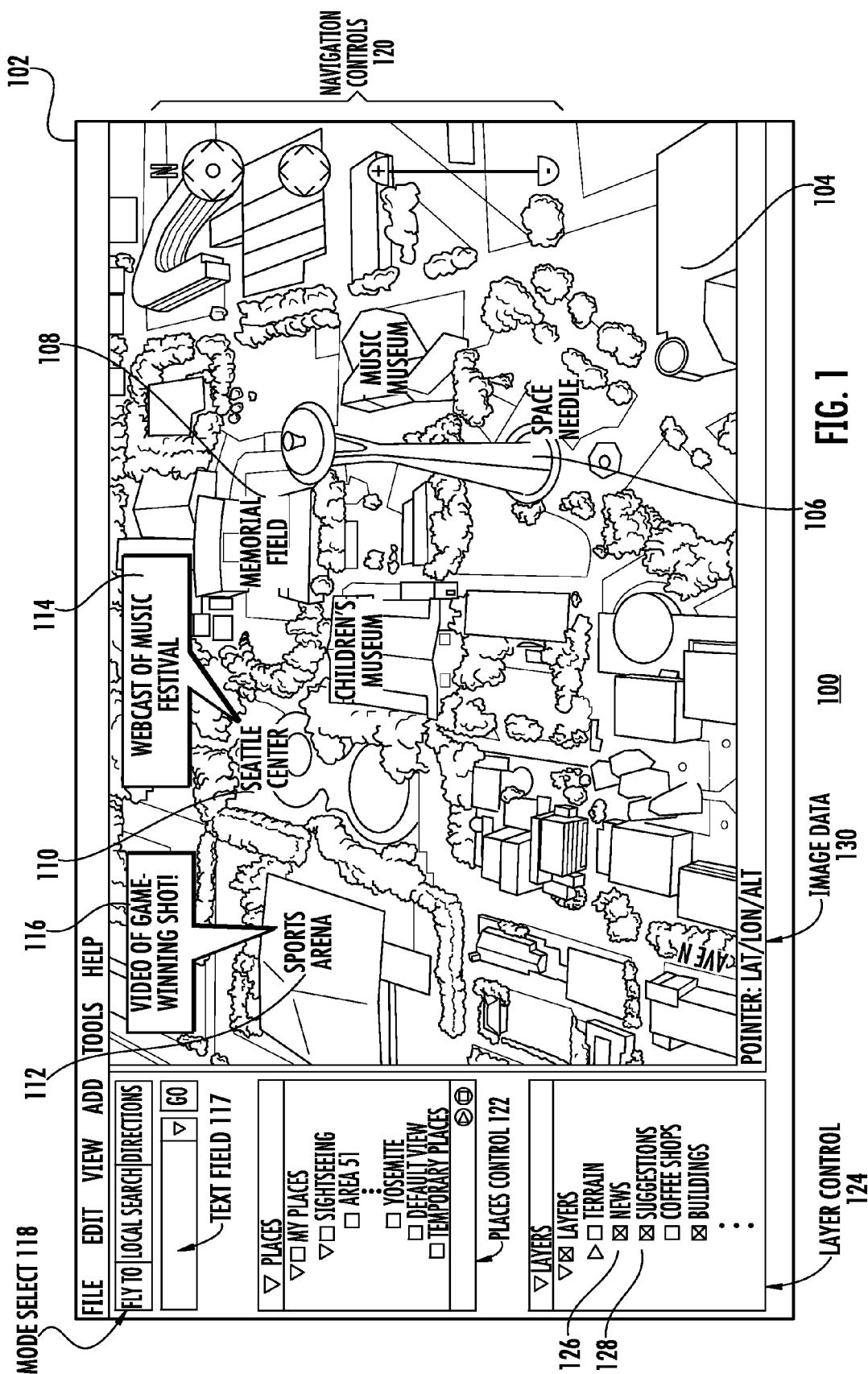
FIG. 1 depicts an exemplary geographic information system as presented within an exemplary graphical user interface according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to systems and methods for identifying increased user interest in a geographic area and selecting and promoting content associated with such geographic area within a geographic information system. More particularly, a geospatial data object that is experiencing a significant increase in loads compared to recent or average load volume can be identified and deemed to be "hot." For example, in response to a real-world event, a plurality of users can employ the geographic information system to learn about or explore the geographic area in which the real-world event has occurred or will occur, downloading the corresponding geospatial data objects in the process. In such fashion, increased client device access of a geospatial data object can indicate an increased user interest in the geographic area represented by the geospatial data object. Once a geospatial data object has been identified, an item of content associated with the geographic area represented by the geospatial data object can be selected and promoted within the geographic information system.

A host server can provide access to a geographic information system for a plurality of client devices. The geographic information system can include a plurality of geospatial data objects respectively depicting or representing a plurality of geographic areas. For example, each geospatial data object can define a discrete geographic area and can contain geospatial data associated with such geographic area. Exemplary geospatial data objects can include map tiles, street level panoramic images, or other suitable geospatial data objects. The host server or an associated computing device can monitor each instance in which a geospatial data object is accessed or loaded by a client device.

A geospatial data object that is experiencing an increased volume of access can be identified in several ways. For example, a statistical measure can be applied to access data describing the number of instances in which the host server provides access to the first geospatial data object to one or more client devices. Applying such statistical measure can result in identifying an increased volume of access by one or more client devices with respect to the first geospatial data object.

As another example, the number of instances in which each geospatial data object is accessed by one or more client devices can be monitored for a plurality of periods. A period that exhibits an increase in the number of loads of a first geospatial data object can be identified. Such increase in the number of loads of the first geospatial data object can indicate an increased user interest in the geographic area represented by the first geospatial data object.

As yet another example, a volume of access versus time can be measured for each of the plurality of geospatial data objects. A derivative of such volume of access can be monitored and a first geospatial data object having a derivative exhibiting a positive value exceeding a threshold value can be identified. Such positive derivative value can indicate an increased volume of access with respect to the first geospatial data object.

After a geospatial data object that is experiencing an increased volume of access is identified, an item of content associated with the geographic area represented by the geospatial data object can be selected. Such item of content can relate to a real-world event associated with the geographic area represented by the identified geospatial data object. In particular, an item of content can be selected that is relevant to the real-world event causing the increase in the number of loads of the geospatial data object.

According to an aspect of the present disclosure, selecting an item of content can include identifying one or more points of interest associated with the geographic area represented by the geospatial data object. For example, one or more buildings, monuments, parks, businesses, organizations, or other points of interest can be located within the geographic area represented by the geospatial data object. The point of interest that is most related to the increase in geospatial data object loads can be identified according to a point of interest selection algorithm that incorporates historical traffic data or secondary signals such as news articles, social media postings, or other web-content.

After a point of interest associated with the geographic area represented by the geospatial data object has been identified, an item of content associated with the point of interest can be selected. For example, a specific news article, photograph, video, webpage, map content, or other internal or external item of content associated with the point of interest can be selected and promoted within the geographic information system. The item of content can be selected based upon a number of factors, including relevance, popularity, advertising partnerships, or other suitable factors.

The selected item of content can be promoted within the geographic information system. For example, the item of content can be suggested to a user of the geographic information system. As another example, a user of the geographic information system can be incentivized to select or otherwise load the item of content.

Exemplary Geographic Information System

Exemplary computer-based systems and methods for selecting and promoting an item of content according to an exemplary embodiment of the present disclosure will now be set forth. The present subject matter will be discussed with reference to a geographic information system allowing a user to navigate geographic imagery, such as the Google Earth™ virtual globe application developed by Google Inc. Those of ordinary skill in the art, using the disclosures provided herein, should understand that the present disclosure is equally applicable to other suitable geographic information systems. In addition, the inherent flexibility of computer-based systems allows for a great variety of possible configurations, combinations, and divisions of tasks and functionality between and among the components. For instance, the systems and methods discussed herein can be implemented using a single computing device or across multiple computing devices.

FIG. 1 depicts an exemplary geographic information system 100 as presented within an exemplary graphical user interface 102 according to an exemplary embodiment of the present disclosure. Geographic information system 100 provides for the archiving, retrieving, and manipulation of geospatial data that has been indexed and stored according to geographic coordinates, such as latitude, longitude, and altitude coordinates. Geographic information system 100 can combine geospatial data such as satellite imagery, photographs, maps, models, tables, and other geospatial data with Internet search capability so as to enable a user to view imagery of the planet (e.g. as a portion of a virtual globe) and related information (e.g., locales such as islands and cities; and points of interest such as local restaurants, hospitals, parks, hotels, and schools).

Exemplary geospatial data includes geographic imagery 104. Geographic imagery 104 can be satellite imagery, aerial imagery, three-dimensional imagery, map imagery, street level panoramic imagery, or other suitable geographic imagery. In particular, geographic information system 100 can provide geographic imagery 104 for display within graphical user interface 102. For example, a user of geographic information system 100 can input or request a geographic area of interest and, in response, the geographic information system can provide geographic imagery 104 depicting such geographic area for display within graphical user interface 102.

Exemplary geospatial data can further include visual depictions or annotations of one or more points of interest, such as points of interest 106, 108, 110, and 112. As used herein, a "point of interest" refers to any feature, landmark, point of interest, or other object or event associated with a geographic location. For instance, a point of interest can include a business, restaurant, retail outlet, coffee shop, bar, music venue, attraction, museum, theme park, arena, stadium, festival, organization, entity, or other suitable points of interest. Data associated with point of interests 106, 108, 110, and 112 can include the name of the point of interest and the location of the point of interest, such as longitude, latitude, and altitude coordinates associated with the point of interest.

Due to the massive volume of geospatial data inherent to geographic information system 100, such geospatial data can be spatially partitioned and organized into a plurality of geospatial data objects. Each geospatial data object can define a discrete geographic area and can contain geospatial data associated with such geographic area. For example, each geospatial data object can contain all geographic imagery and other geospatial data associated with a defined geographic area. Exemplary geospatial data objects will be discussed in further detail with reference to FIGS. 3A and 3B. Spatially partitioning the data of the geographic information system into discrete geospatial data objects can facilitate the organization and processing necessary to implement geographic information system 100.

According to another aspect of the present disclosure, geographic information system 100 can further include one or more items of content, such as items of content 114 and 116. In particular, items of content 114 and 116 can be selected for promotion within geographic information system 100. One of skill in the art, in light of the disclosures contained herein, will understand that items of content 114 and 116 may not be fully included or fully displayed within graphical user interface 102. Instead, a link, icon, or other suitable means of presentation or availability can be used to provide a user access to the content.

Referring again to FIG. 1, graphical user interface 102 can include a display window for displaying geographic imagery 104 and a text input field 117 for entering location information such as latitude and longitude, an address and/or zip code, or the name of a point of interest (e.g., "Lincoln Memorial" or "Area 51"). Graphical user interface 102 can also have a number of modes in which it can operate, including Fly To mode, Local Search mode, and Directions mode, as shown by mode select buttons 118.

Graphical user interface 102 can include navigation controls 120 such as a zoom control for adjusting the viewing altitude, a tilt control for adjusting the viewing angle, a rotation control for rotating the view clockwise and counterclockwise, and a pan control for adjusting the presented area of interest. Graphical user interface 102 can also include places control 122, which allows the user to organize saved data in a Places panel in a way similar to how a user would organize files and folders on a computer's hard drive.

Graphical user interface 102 can further include layer control 124, which provides for the toggling of a variety of geospatial data layers (e.g., points of interest, as well as map, road, terrain, and building data) that a user can select to display over the viewing area. A user can implement layer control 124 to enable data layers showing, for example, parks, schools, hospitals, airports, shopping, and other points of interest or locales. The user can also layer multiple searches, save results to folders, and share search results and maps with others.

In the embodiment shown in FIG. 1, exemplary layers are available on the Layers panel. For example, a news layer can be enabled using news toggle 126. When the news layer is enabled, geographic information system 100 can present location-specific news items. For example, item of content 116 can be a news item associated with point of interest 112 and can be presented within the display window in conjunction with point of interest 112. Such location-specific news items can be selected in accordance with aspects of the present disclosure. More particularly, the news items can be selected and promoted on account of their association with a geospatial data object experiencing an increased volume of access.

As another example, a suggestions layer can be enabled using suggestions toggle 128. When the suggestions layer is enabled, geographic information system 100 can present suggested items of content to a user. Such suggested items of content can be selected in accordance with aspects of the present disclosure. More particularly, the suggested items of content can be selected and promoted on account of their association with a geospatial data object experiencing an increased volume of access.

The suggestions layer can be personalized or otherwise configured to suggest items of content that meet user inputted guidelines, preferences, or other data. However, such personalization is only implemented if the user has provided affirmative consent to such personalization after the user has been informed of what data is collected, how the data is collected, and how such data will be used. The user can modify or revoke consent to the personalization process at any time. Further, any data collected by or inputted into geographic information system 100 can be handled in a way that preserves and respects user privacy. As an example, a user can personalize the suggestions layer to provide content relevant to the user's interests. For instance, if the user has personalized the suggestions layer by requesting content associated with live music performances, then geographic information system 100 can suggest item of content 114, which provides a webcast of a music festival.

One of skill in the art, in light of the disclosures provided herein, will understand that there are many various ways to suggest an item of content to a user, and that each of such ways can be used to satisfy the present disclosure. For example, an item of content can be suggested upon initialization of a client device application providing access to geographic information system 100. As another example, a button can be provided in graphical user interface 102 that, when selected by a user, prompts geographic information system 100 to suggest an item of content to the user.

The exemplary graphical user interface 102 shown in FIG. 1 also displays image information data 130 in the lower portion of the display window. Image information data 130 can include pointer/cursor coordinates (e.g. latitude/longitude/altitude), streaming percentage completion, and eye altitude (i.e. camera distance).

Numerous graphical user interface configurations and underlying functionalities will be apparent in light of this disclosure, and the present disclosure is not intended to be limited to any one particular configuration. For example, displayed geographic imagery 104 can be manipulated using graphical user interface 102. Graphical user interface 102 can be used to reposition the current map view, for example, by clicking and dragging in the display window. A user can also select a point of interest or item of content by clicking on it within the display window.

Exemplary System Architecture

Figure 2:
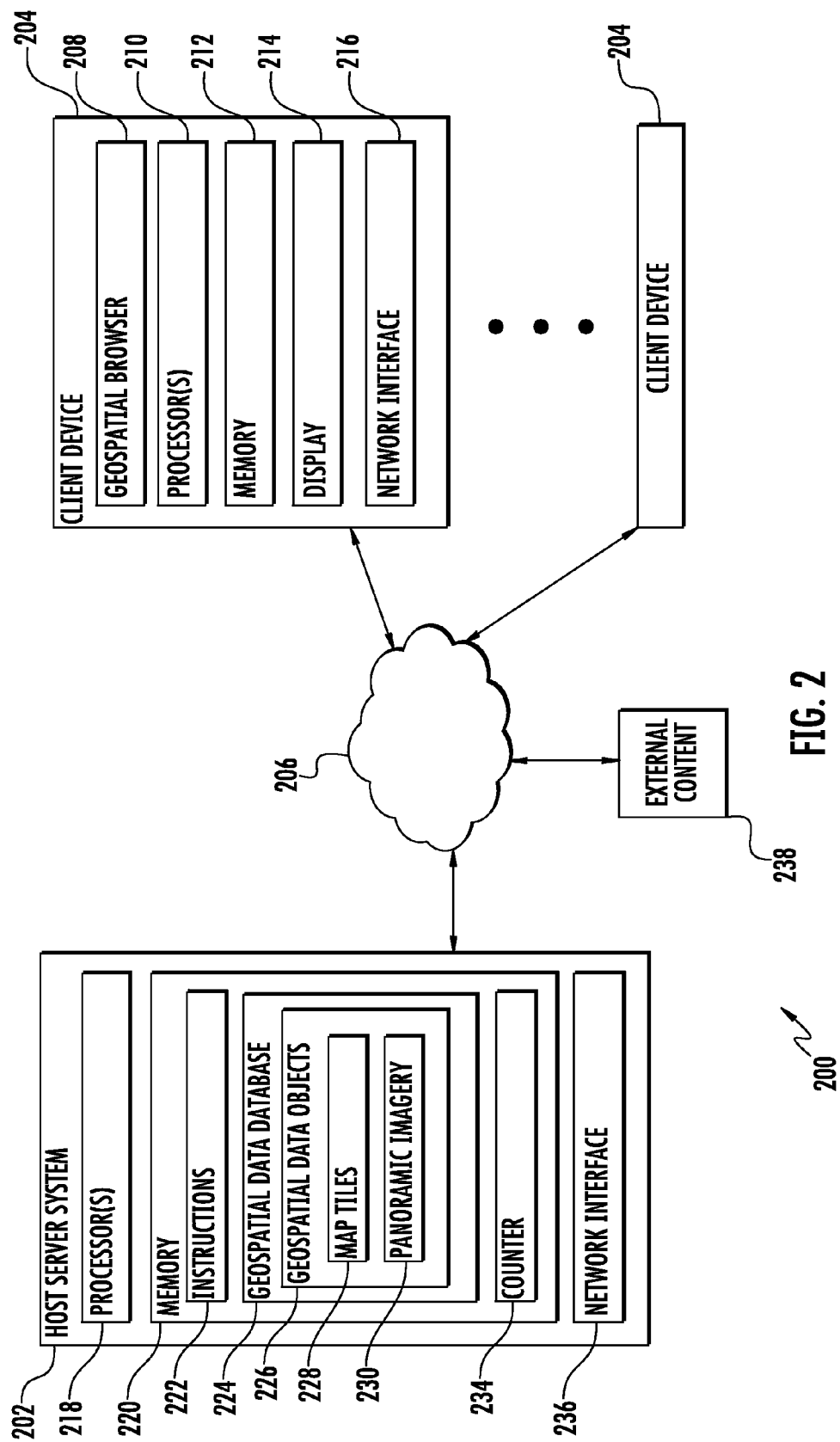
FIG. 2 depicts an exemplary computer-based system according to an exemplary embodiment of the present disclosure.

FIG. 2 illustrates an exemplary computer-based system 200 configured in accordance with an embodiment of the present invention. System 200 includes a client-server architecture, where a host server system 202 communicates with one or more client devices 204 over a network 206. Although two client devices 204 are illustrated in FIG. 2, any number of client devices 204 can be connected to host server 102 over network 206. Each client device 204 can include a geospatial browser 208 that can provide the user with a customized interface to system 200. For example, geospatial browser 208 can implement graphical user interface 102 of FIG. 1.

A client device 204 can be, for example, a computing device having a processor 210 and a memory 212, such as a desktop or laptop computer. Alternatively, a client device 204 can be a wireless device, such as a personal digital assistant (PDA), smart phone, tablet, navigation system located in a vehicle, handheld GPS system, or other such devices/systems. In short, the client device 204 can be any computer, device, or system that can allow the user to interact with the host server system 202 (e.g., requesting maps, driving directions, and/or data searches, and then receiving data files in response).

Processor 210 of client device 204 can be any suitable processing device and can be one processor or a plurality of processors that are operably connected. Memory 212 can store computer-readable instructions that when executed by processor 210 cause processor 210 to perform operations, including running geospatial browser 208. Client device 204 can include a display 214 for presenting the geographic imagery received from host server system 202 to a user. Client device 204 can further include a network interface 216 for providing communications over the network 206. Network interface 216 can be any device/medium that allows the client to interface with network 206.

Client device 204 can send a request for geographic imagery associated with a requested geographic area to host server system 202 over network 206 via network interface 216. Client device 204 can then receive geographic imagery and associated data and present at least a portion of the geographic imagery through a viewport or graphical user interface of geospatial browser 208 on display 214.

Host server system 202 can be implemented using one or more suitable computing devices and can include a processor 218, a memory 220, and a network interface 236. Memory 220 can store instructions 222 that cause processor 218 to perform operations. Processor 218 can be any suitable processing device and can be one processor or a plurality of processors which are operably connected.

Memory 220 can include a geospatial data database 224. Geospatial data database 224 can store or provide the geospatial data used by the geographic information system. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. While geospatial data database 224 is shown in FIG. 1 as included within memory 220, one of skill in the art, in light of the disclosures provided herein, will understand that geospatial data database 224 can be located remotely and accessed by host server system 202 over network 206.

According to an aspect of the present disclosure, the geospatial data contained within geospatial data database 224 can be spatially partitioned and organized into a plurality of geospatial data objects 226. Geospatial data objects 226 can be used to spatially partition the massive amounts of geospatial data included within geospatial data database 224 into relatively discrete, manageable pieces. In particular, a geospatial data object 226 can represent a defined geographic area and include some or all of the geospatial data associated with such geographic area. Spatially partitioning the geospatial data of the geographic information system into discrete geospatial data objects 226 can facilitate the organization and processing necessary to implement the geographic information system.

Figure 3A:
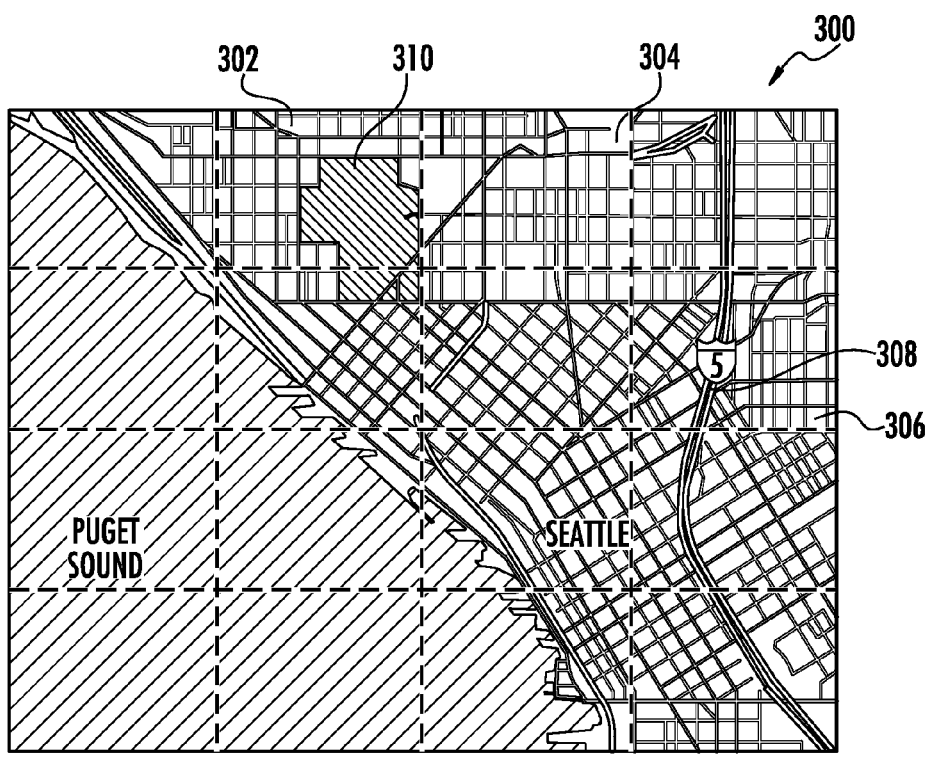
FIGS. 3A and 3B depict exemplary geospatial data objects according to exemplary embodiments of the present disclosure.
Figure 3B:
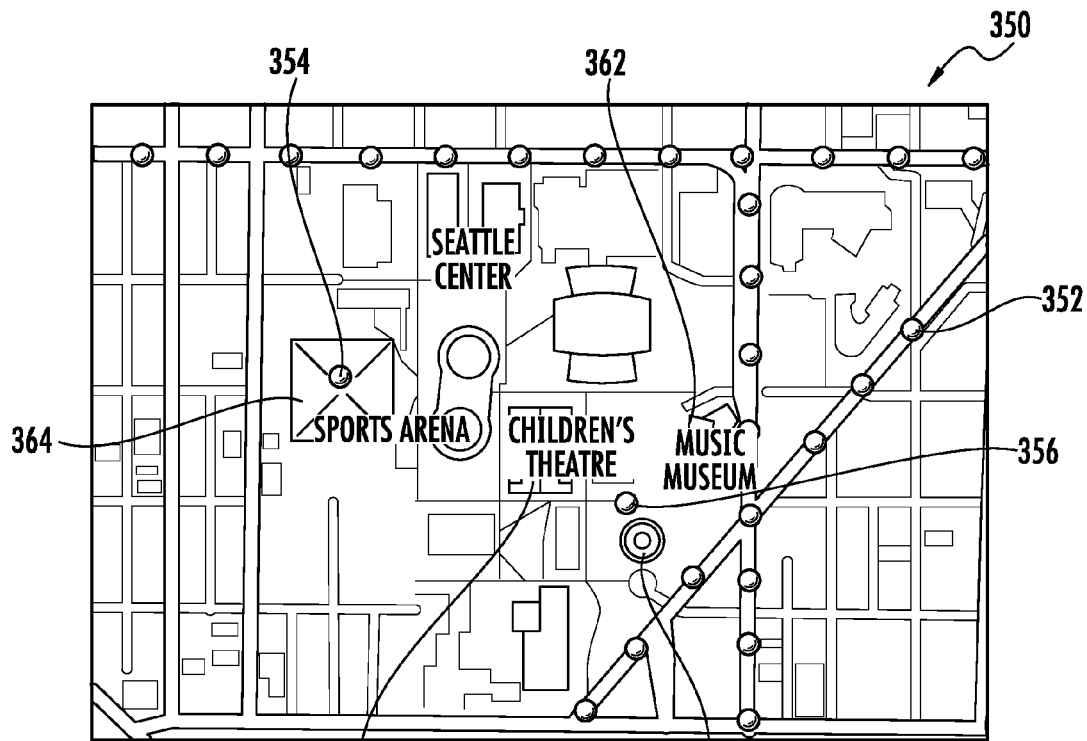

FIGS. 3A and 3B depict exemplary geospatial data objects according to exemplary embodiments of the present disclosure. For example, FIG. 3A depicts a plurality of geospatial data objects in the form of exemplary map tiles according to an exemplary embodiment of the present disclosure. More particularly, FIG. 3A depicts a map 300 made of a plurality of map tiles, including map tiles 302, 304, and 306.

Map tiles 302, 304, and 306 each represent a defined geographic area and include geospatial data associated with such geographic area. For example, map tile 306 can combine map imagery with vector representations of roads, such as road 308. As another example, map tile 302 can include imagery depicting one or more points of interest, such as point of interest 310. An annotation can be provided that indicates the identity of point of interest 310.

Map tiles 302, 304, and 306 can be indexed and stored based on the location of the geographic area they represent. Locations can be expressed and requested in various ways, including latitude/longitude/altitude positions, street addresses, building names, or other data capable of identifying one or more locations. In such fashion, a geographic information system is capable of selecting, retrieving and transmitting one or more map tiles in response to a request specifying a particular geographic area or location. For example, if a user requested a map of downtown Seattle, then the geographic information system could retrieve and provide the map tiles depicted in FIG. 3A, including tiles 302, 304, and 306. Together, such tiles would provide, in the form of map 300, the geospatial data associated with the downtown Seattle.

Map tiles are not limited to any particular data format. For example, map tiles can include geospatial data such as street maps, satellite images, aerial images, other suitable images, or a combination of these. The map tiles can be stored as vectors (e.g. in the case of street maps) or bitmaps (e.g. in the case of satellite images and/or aerial images).

Depending on the resolution (e.g., whether the map is zoomed in or out), one map tile can cover a large region (e.g. a State) in relatively little detail. Another map tile can cover a much smaller region (e.g. a neighborhood) in relatively high detail. In addition, map tiles can be arranged in a data structure, such as a quadtree or octree data structure, to facilitate fetching, culling, and level of detail management of the data. For example, the geographic information system can transition from a lower resolution tile representing a larger geographic area to a plurality of higher resolution sub-tiles respectively representing smaller geographic areas as a user zooms in on the map.

FIG. 3B depicts a plurality of geospatial data objects in the form of exemplary street level panoramic images according to an exemplary embodiment of the present disclosure. More particularly, FIG. 3B depicts a map 350 having a plurality of icons showing available street level panoramic images, including panoramic images 352, 354, and 356. One of skill in the art, in light of the disclosure contained herein, will understand that while FIG. 3B uses icons to depict available panoramic images 352, 354, and 356 on map 350, such depiction is for the purposes of simplified representation of available panoramic images only. In particular, when selected, panoramic images 352, 354, and 356 can provide a fully immersive street level panoramic image experience.

Panoramic images 352, 354, and 356 can be street level panoramic images representing a geographic area. For example, street level panoramic images can include images captured by cameras positioned within the geographic area from a perspective at or near the ground level or street level. As such, panoramic images 352, 354, and 356 can depict objects such as buildings, trees, monuments, points of interest, etc. from a perspective of a few feet above the ground.

Although the term "street level" images is used, street level panoramic images are not limited to any particular height above the ground. For example, a street level image can be taken from the top of a building. Panoramic street level images can be created by stitching together the plurality of photographs taken from the different angles. The panoramic image can be presented as a flat surface or as a texture-mapped three dimensional surface such as, for instance, a cylinder or a sphere.

Panoramic images 352, 354, and 356 can be used to provide an immersive 360° panoramic viewing experience to a user centered about the geographic area represented by the panoramic image. For example, a user can select panoramic image 356 and view a street level panoramic image of the geographic area represented by panoramic image 356. In particular, panoramic image 356 can include imagery depicting points of interest 358, 360, and 362. Annotations indicating the identity of points of interest 358, 360, and 362 can be included within panoramic image 156. Thus, the geographic area represented by panoramic image 356 can include points of interest 358, 360, and 362.

As another example, a user can select panoramic image 354. In this case, panoramic image 354 can be a panoramic image of the interior of point of interest 364, shown in FIG. 3B as a sports arena. Thus, the geographic area represented by panoramic image 354 can be the interior of point of interest 364.

Similar to map tiles 302, 304, and 306, panoramic images 352, 354, and 356 can be indexed and stored based on the location of the geographic area they represent. Locations can be expressed and requested in various ways, including latitude/longitude/altitude positions, street addresses, building names, or other data capable of identifying one or more locations. In such fashion, a geographic information system is capable of selecting, retrieving and transmitting one or more panoramic images in response to a request specifying a particular geographic area or location. For example, if a user requested geospatial data associated with point of interest 364, then the geographic information system could retrieve and provide panoramic image 354.

According to aspects of the present disclosure, the number of instances in which a geospatial data object is accessed or loaded by a client device can be monitored or otherwise measured. As an example, referring now to FIG. 2, memory 220 can further include a counter 234. Counter 234 can store a plurality of values respectively associated with the number of instances in which each geospatial data object 226 is accessed by a client device. For example, each time host server system provides access to or serves a geospatial data object 226 to a client device 204, the respective value stored by counter 234 can be incremented.

One of skill in the art, in light of the disclosures provided herein, will understand that there are many various ways in which the number of instances in which a geospatial data object is accessed can be monitored. As such, counter 234 of FIG. 2 is exemplary in nature and not intended to limit the scope of the present disclosure to such particular hardware or method of counting. Any system or method that monitors or measures the number of instances in which each geospatial data object is accessed by a client device can satisfy the present disclosure.

In addition, while the phrasing "accessed by a client device" has been used herein, one of skill in the art, in light of the disclosures contained herein, will understand that such phrasing has been chosen for the purpose of illustration and not for the purpose of limiting the scope of the present disclosure. As such, the phrasing "accessed by a client device," as used herein, incorporates all forms of transfer or transmission of a geospatial data object from host server system 202 to a client device 204, including, without limitation, host server system 202 serving a geospatial data object to a client device 204 and client device 204 downloading a geospatial data object from host server system 202.

Host server system 202 can be implemented with conventional or custom technology. Numerous known server architectures and functionalities can be used to implement a geographic information system server. Host server system 202 can include one or more servers operating under a load balancing scheme, with each server (or a combination of servers) configured to respond to and interact with client devices 204 via network 206.

In general, when the user enters a search query (e.g., via the geospatial browser 208), it is formatted into a request and sent to host server system 202 via network 206. Host server system 202 then determines the nature of the search query, and responds with the appropriate data from various sub-systems, such as geo-coders, routing engines, and local search indexes, in a format that the requesting client device 204 can use to present the data to the user (e.g., via the geospatial browser 208).

As an example, in the case that a user entered a search query for "downtown Seattle," host server system 202 can determine the geographic areas implicated by the search query, retrieve the appropriate geospatial data objects 226 that represent such geographic areas, and serve the appropriate geospatial data objects 226 to client device 204 over network 206. For example, host server system 202 can serve the plurality of map tiles depicted in FIG. 3A in response to such a search query. Further, counter 234 can be incremented with respect to each map tile served, including map tiles 302, 304, and 306. In such fashion, the number of instances in which each geospatial data object is accessed by a client device can be monitored.

Network 206 can be any type of communications network, such as a local area network (e.g., intranet), wide area network (e.g., Internet), or some combination thereof and can include any number of wired or wireless links. In general, communication between the host server system 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Computer based system 200 can further include external content 238. External content 238 can be any form of external content including news articles, webpages, video files, audio files, written descriptions, ratings, game content, social media content, photographs, commercial offers, or other suitable external content. Host server system 202 and client device 204 can access external content 238 over network 206. External content 238 can be searched according to known searching methods and can be ranked according to relevance, popularity, or other suitable attributes.

Exemplary Method for Identifying Increased User Interest and Promoting Content

Figure 4:
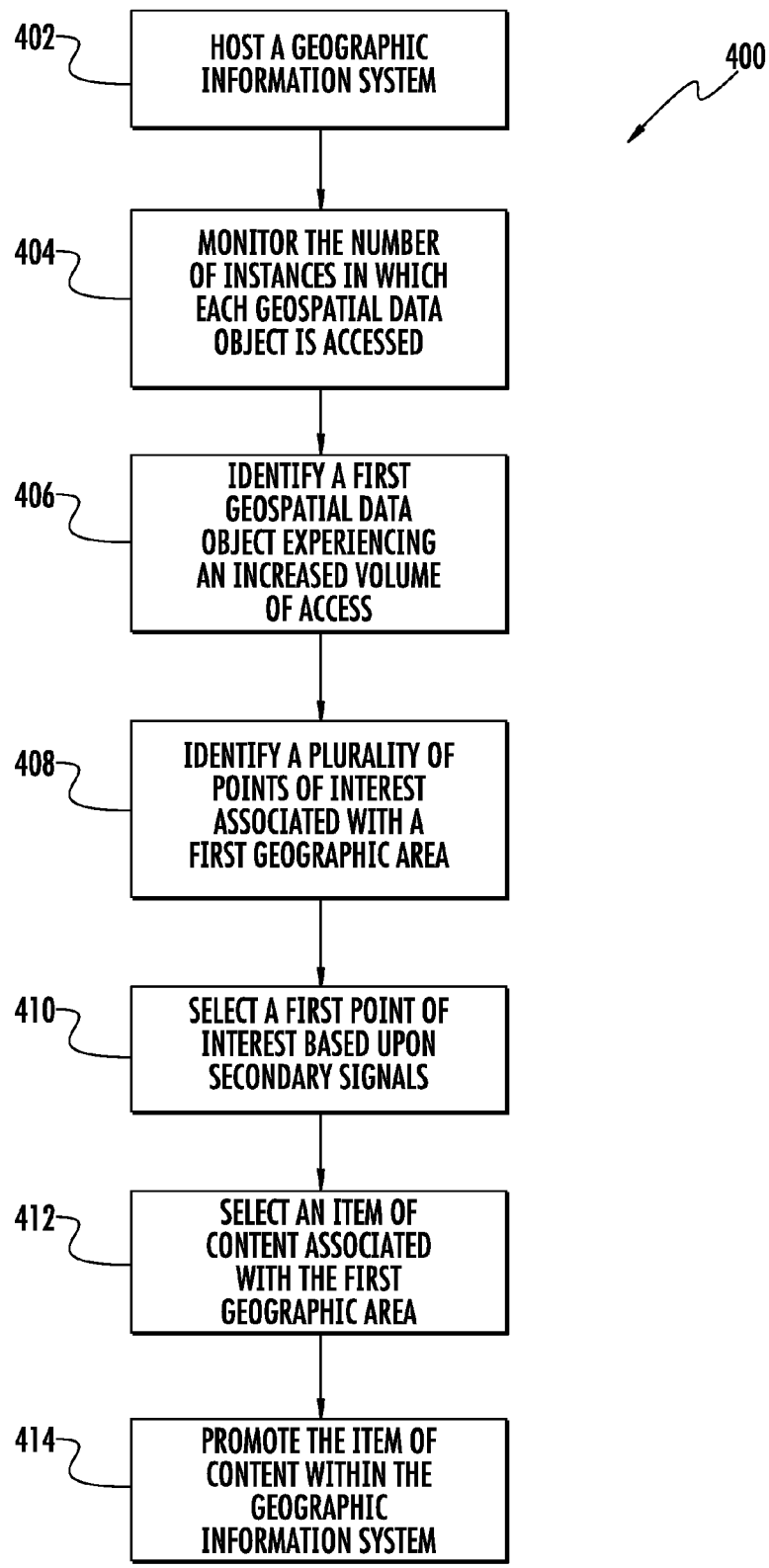
FIG. 4 depicts a flow chart of an exemplary computer-implemented method for identifying increased user interest in a geographic area and selecting and promoting content associated with such geographic area according to an exemplary embodiment of the present disclosure.

FIG. 4 depicts a flow chart of an exemplary computer-implemented method (400) for identifying increased user interest in a geographic area and selecting and promoting content associated with such geographic area according to an exemplary embodiment of the present disclosure. While exemplary computer-implemented method (400) will be discussed with reference to computer-based system 200 of FIG. 2, computer-implemented method (400) can be implemented using any suitable computing system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402) a geographic information system is hosted on a server. For example, host server system 202 can host a geographic information system and provide access to such geographic information system to one or more client devices, such as client devices 204. Such geographic information system can provide for the archiving, retrieving, and manipulating of geospatial data that has been stored and indexed according to geographic coordinates associated with such geospatial data.

In particular, such geospatial data can be spatially partitioned into a plurality of geospatial data objects. Each geospatial data object can define a discrete geographic area and can contain geospatial data associated with such geographic area. For example, each geospatial data object can contain all geographic imagery and other geospatial data, such as points of interest, associated with the defined geographic area.

At (404) the number of instances in which each geospatial data object is accessed by a client device is monitored. For example, host server system 202 can provide access to one or more geospatial data objects to a client device in response to a request from such client device. As an example, in the case that a user entered a search query for "downtown Seattle," host server system 202 can determine the geographic areas implicated by the search query, retrieve the appropriate geospatial data objects that represent such geographic areas, and serve the appropriate geospatial data objects to a client device over a network. In particular, host server system 202 can serve the plurality of map tiles depicted in FIG. 3A in response to such a search query. The number of instances in which access is provided to each geospatial data object can be monitored or otherwise tracked.

In one implementation, the server hosting the geographic information system can include a counter. Such counter can store a plurality of values respectively associated with the number of instances in which each geospatial data object is accessed by a client device. For example, each time the host server provides access to or serves a geospatial data object to a client device, the respective value stored by the counter can be incremented.

One of skill in the art, in light of the disclosures provided herein, will understand that there are many various ways in which the number of instances in which a geospatial data object is accessed can be monitored. As such, the counter described above is exemplary in nature and not intended to limit the scope of the present disclosure to such particular hardware or method of counting. Any system or method that monitors or measures the number of instances in which each geospatial data object is accessed by a client device can satisfy the step (404).

In addition, while the phrasing "accessed by a client device" has been used herein, one of skill in the art, in light of the disclosures contained herein, will understand that such phrasing has been chosen for the purpose of illustration and not for the purpose of limiting the scope of the present disclosure. As such, the phrasing "accessed by a client device," as used herein, incorporates all forms of transfer or transmission of a geospatial data object from the host server to a client device, including, without limitation, the host server serving a geospatial data object to a client device or a client device downloading a geospatial data object from the host server.

At (406) a first geospatial data object experiencing an increased volume of access is identified. In one implementation, a geospatial data object that is experiencing an increased volume of access can be identified by applying a statistical measure to access data. For example, host server system 202 can generate access data that describes the number of instances in which the host server system 202 provides access to the first geospatial data object to one or more client devices 204. Applying a statistical measure to such access data can result in identifying an increased volume of access with respect to the first geospatial data object. Exemplary statistical measures include comparing a local maximum to a local average or other suitable statistical measures.

In another implementation, a geospatial data object that is experiencing an increased volume of access can be identified by monitoring, for a plurality of periods, the number of instances in which each geospatial data object is accessed by a client device. In particular, a period that exhibits a larger number of loads of a first geospatial data object can be identified. Such increase in the number of loads of the first geospatial data object can indicate an increased user interest in the geographic area represented by the first geospatial data object.

For example, with reference to FIG. 3A, the number of instances in which each of map tiles 302, 304, and 306 are accessed by one or more client devices can be monitored for a plurality of periods. As an example, a real-world event, such as a widely-popular music festival, can be scheduled to occur at point of interest 310. In the days leading up to the music festival, a plurality of users can employ the geographic information system to learn about or explore the geographic area in which point of interest 310 is located, each user downloading map tile 302 in the process. In such fashion, map tile 302 can experience an increased volume of access and, in the case that the number of instances in which map tile 302 is loaded is monitored for a plurality of periods, one of such periods can reflect the increased access by the plurality of users investigating the music festival. Such period can be identified at (406).

One of skill in the art, in light of the disclosures provided herein, will understand that modifying the length of the monitored periods can result in identifying various geospatial data objects. For example, in certain circumstances it can be desirable to monitor the number of instances in which each geospatial data object is accessed by a client device for a plurality of sixty minute periods. Monitoring client device access in such fashion can result in identifying a geospatial data element associated with a real-world event that has driven increased user interest within the previous hour. As another example, it can be desirable to compare client device access over a plurality of week-long periods, such that a geospatial data element associated with a more substantial real-world event is identified.

In addition, one of skill in the art, in light of the disclosures contained herein, will recognize that there are many various ways to identify a period that exhibits a larger number of downloads of a first geospatial data object than selected other periods. Any of such methods can be used to satisfy step (406). For example, a percent change can be evaluated, for each period with respect to a previous sequential period, in the number of instances in which each geospatial data object is downloaded by one or more client devices. A first period which exhibits a percent change with respect to a first geospatial data object that is greater than a threshold value can be identified. A percent change in the number of downloads of the first geospatial object that is greater than a threshold value can indicate an increase in user interest in the geographic area represented by the first geospatial object.

Returning to (406), according to another implementation of the present disclosure, a geospatial data object that is experiencing an increased volume of access can be identified by monitoring a derivative of a volume of client device access. More particularly, a volume of access versus time can be measured for each of the plurality of geospatial data objects at (404). A derivative of such volume of access can be monitored and a first geospatial data object having a derivative exhibiting a positive value exceeding a threshold value can be identified at (406). Such positive derivative value can indicate an increased volume of access with respect to the first geospatial data object.

For example, with reference to FIG. 3B, a volume of access versus time can be measured for each of panoramic images 352, 354, and 356. Further, a derivative of the volume of access with respect to time can be monitored for each of panoramic images 352, 354, and 356. If one of such derivatives exhibits a positive value exceeding a threshold value, then the corresponding panoramic image can be identified at (406).

As an example, a real-world event, such as an exciting sporting event, can have occurred at point of interest 364. In the minutes, hours, or days following the sporting event, a plurality of users can employ the geographic information system to visualize or explore the geographic area associated with point of interest 364. In particular, a plurality of users can visualize the interior of point of interest 364 using panoramic image 354. In such fashion, a derivative describing the change in the number of downloads of panoramic image 354 over time can exhibit a positive value exceeding a threshold value. Such positive value can indicate an increased user interest in the geographic area represented by panoramic image 354 and can be identified at (406).

While the implementations of step (406) disclosed above have been discussed with reference to identifying a single geospatial data object experiencing an increased volume of access, one of skill in the art, in light of the disclosures provided herein, will appreciate that multiple geospatial data objects experiencing an increased volume of access can be identified. More particularly, a plurality of geospatial data objects that represent a single geographic area can be identified.

As an example, with reference to FIGS. 3A and 3B, the geographic area represented by panoramic image 354 of FIG. 3B can also be represented by map tile 302 of FIG. 3A. If both panoramic image 354 and map tile 302 experience an increased volume of access, then increased user interest in the shared geographic area can be assumed.

As another example, map tile 302 can be a member of a data structure, such as a quadtree or octree data structure, which includes sub-groupings of map tiles. One of skill in the art, in light of the disclosures contained herein, will appreciate that an increased user interest in a geographic area can be identified by identifying various combinations of such map tiles that are experiencing an increased volume of access.

For example, a volume of access can be monitored at (404) for only those map tiles of the highest resolution and only a map tile of the highest resolution can be identified at (406). Limiting the identification of map tiles to those of the highest resolution can increase the precision with which increased user interest is identified.

As another example, an algorithm can employ a weighted average to identify an increased user interest in a geographic area. In particular, lower-resolution map tiles that represent a larger geographic area can be given less weight, higher-resolution map tiles that represent a smaller geographic area can be given more weight, and panoramic images can be given the greatest weight. Using such an algorithm, increased user interest in a geographic area represented by one or more geospatial data objects can be identified.

Returning to FIG. 4, at (408) a plurality of points of interest can be identified. Such points of interest can be associated with the geographic area represented by the first geospatial data object identified at (406). For example, a host server can retrieve the first geospatial data object from memory and identify a plurality of points of interest located within the geographic area represented by the first geospatial data object. The plurality of points of interest can be identified based upon geospatial data included within the first geospatial data object. Alternatively, the plurality of points of interest can be identified by accessing a point of interest database. The boundaries of the geographic area represented by the first geospatial data object can be used as limitations when accessing the point of interest database.

As an example, with reference to FIG. 3B, if panoramic image 356 experiences an increased volume of access and is identified at (406), then at (408) a plurality of points of interest associated with the geographic area represented by panoramic image 356 can be identified. More particularly, panoramic image 356 can include visual imagery depicting points of interest 358, 360, and 362 and points of interest 358, 360, and 362 can be identified at (408).

Returning to FIG. 4, at (410) a first point of interest can be selected from the plurality of points of interest identified at (408) based upon a point of interest selection algorithm that incorporates one or more secondary signals. In particular, the point of interest selected at (410) can be the point of interest that is most related to the increased volume of access experienced by the geospatial data object identified at (406). Selecting a first point of interest at (410) can narrow the possible items of content to be selected from at (412).

The point of interest selection algorithm can incorporate one or more secondary signals to select the first point of interest. Exemplary secondary signals can include the results of a web search, a search of recent news articles, a search of social media postings, the number of incoming links associated with a point of interest, or other suitable secondary signals.

For example, if users of a social media platform provide affirmative consent after a full disclosure of what data is collected, how it is collected, and how such data is used, all available postings of the social media platform can be searched for the title of each of the plurality of points of interest identified at (408). The point of interest that was referenced in the most postings can be selected at (410). In such fashion, the point of interest selected at (410) can be the point of interest that is most likely related to the increased volume of access experienced by the geospatial data object identified at (406). In addition, such consent can be modified or revoked at any time and all data can be handled in a way the preserves and protects user privacy.

As another example, with reference to FIG. 3B, if points of interest 358, 360, and 362 are identified at (408), then a search engine can search available recent news articles for the respective titles of each of points of interest 358, 360, and 362. If a real-world event causing increased user interest has recently occurred at point of interest 358, then a search of recent news articles using the title of point of interest 358 should provide the largest number of relevant results. In such case, point of interest 358 can be selected at (410). Alternatively, the number of relevant news results for each point of interest can be compared against historical volumes of news results for that point of interest such that a point of interest which is experiencing increased news discussion is identified and selected at (410)

As yet another example, the plurality of points of interest identified at (408) can be classified into a plurality of groups or layers and the point of interest selection algorithm can consider such points of interest on a layer by layer basis. A point of interest can be selected from each layer and one or more of such points of interest can be selected at (410).

One of skill in the art, in light of the disclosures contained herein, will understand that the methods disclosed herein for selecting a point of interest by searching social media postings or available news articles for the title of each point of interest are simplified for the purposes of illustration and, thus, do not limit the scope of the disclosure to such methods. In particular, a point of interest selection algorithm for selecting a first point of interest at (410) can include a variety of secondary signals in addition to those discussed herein and can include weightings, iterations, feedback, or other suitable complexities or combinations such that the point of interest most likely related to the increased volume of access experienced by the geospatial data object identified at (406) is selected at (410).

At (412) an item of content can be selected. Such item of content can be associated with the geographic area represented by the first geospatial data object identified at (406). More particularly, the item of content can be associated with the first point of interest selected at (410). The item of content can be selected based upon a content selection algorithm which incorporates relevance data, popularity data, advertising partnership data, or other suitable data. The item of content can be internal to the geographic information system (e.g. a placemarker, 3-D rendering, panoramic image, or other suitable internal content) or can be retrieved from external content 238 of FIG. 2 (e.g. news articles, webpages, video files, audio files, written descriptions, ratings, game content, social media content, photographs, commercial offers, or other suitable external content).

As an example, a plurality of items of content can be identified and the item of content that is most relevant to the real-world event causing the increased user interest in the geographic area can be selected. Relevance can be determined by comparing the subject matter of each item of content with the point of interest selected at (410). Relevance can also be determined by comparing the time at which each item of content was generated with the time at which the geospatial data object experienced the increased volume of access.

As another example, the content selection algorithm can also incorporate popularity data. In general, the popularity of an item of content can positively influence the probability that such item of content will be selected at (412). For example, if two items of content are identified which are equally relevant to the real-world event causing the increased user interest, it can be desirable to select the more popular item of content to increase user satisfaction. Popularity can be determined by comparing, for example, page views or social media virality factors such as comments, replies, or rebroadcasts.

As yet another example, the content selection algorithm can incorporate advertising partnership data. For example, the host of the geographic information system can have an advertising partnership with a specific content provider. In such case, the items of content available for selection at (412) can be limited to those items of content available from the content provider. Alternatively, the items of content available from the content provider and advertising partner can have an increased probability of being selected at (412) as compared with items of content from content providers who are not advertising partners.

Using such content selection algorithm, an item of content can be selected that is associated with a geospatial data object experiencing an increased volume of access. In particular, the likelihood that the selected item of content will be relevant to a real-world event that the user is investigating can be increased.

At (414) the selected item of content is promoted within the geographic information system. For example, with reference to FIG. 1, the item of content can be suggested to a user of the geographic information system in accordance with the suggestions layer. When the suggestions layer is enabled, geographic information system 100 can periodically suggest items of content to a user. As another example, provided that a user has affirmatively consented to the personalization of the suggestions layer, geographic information system 100 can suggest item of content 114, which provides a webcast of a music festival, to a user that has requested content associated with live music performances.

One of skill in the art, in light of the disclosures provided herein, will understand that there are many various ways to suggest an item of content to a user, and that each of such ways can be used to satisfy step (414). For example, an item of content can be suggested upon initialization of a client device application providing access to the geographic information system. As another example, a button can be provided in graphical user interface 102 of FIG. 1 that, when selected by a user, prompts the geographic information system to suggest an item of content to the user.

An item of content can also be promoted in accordance with step (414) by incentivizing a user to select or otherwise download the item of content. For example, a reward, medal, or other accomplishment can be bestowed upon a user of the geographic information system who successfully loads a given number of items of content. As another example, the item of content can include a commercial offer or coupon and the user can receive the commercial offer by selecting the item of content from within the geographic information system.

Promoting an item of content in such fashion increases the visibility of content associated with a geospatial data object experiencing an increased volume of access. Thus, a user of the geographic information system can be provided with timely content related to a real-world event that the user may be investigating.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of promoting content, the method comprising:
   providing, by one or more computing devices, a geographic information system comprising a plurality of geospatial data objects respectively representing a plurality of geographic areas, wherein the plurality of geospatial data objects are accessible by one or more client devices;
   identifying, by the one or more computing devices, a first geospatial data object experiencing an increased volume of access, the first geospatial data object representing a first geographic area;
   selecting, by the one or more computing devices, an item of content associated with the first geographic area; and
   promoting, by the one or more computing devices, the item of content within the geographic information system.

2. The computer-implemented method of claim 1, wherein identifying, by the one or more computing devices, a first geospatial data object experiencing an increased volume of access comprises applying, by the one or more computing devices, a statistical measure to access data associated with the first geospatial data object to identify an increased volume of access, the access data describing the number of instances in which a host server provides access to the first geospatial data object to the one or more client devices.

3. The computer-implemented method of claim 1, wherein identifying, by the one or more computing devices, a first geospatial data object experiencing an increased volume of access comprises:
   monitoring, by the one or more computing devices for a plurality of periods, the number of instances in which each of the plurality of geospatial data objects is accessed by the one or more client devices; and
   identifying, by the one or more computing devices, a first period that exhibits a larger number, with respect to selected other periods of the plurality of periods, of instances in which a first geospatial data object is accessed.

4. The computer-implemented method of claim 1, wherein identifying, by the one or more computing devices, a first geospatial data object experiencing an increased volume of access comprises:
   measuring, by the one or more computing devices for each of the plurality of geospatial data objects, a volume of access versus time;
   monitoring, by the one or more computing devices for each of the plurality of geospatial data objects, a derivative of the volume of access with respect to time; and
   identifying, by the one or more computing devices, a first geospatial data object having a derivative exhibiting a positive value exceeding a threshold value.

5. The computer-implemented method of claim 1, wherein the increased volume of access and the item of content relate to a real-world event associated with the first geographic area represented by the first geospatial data object.

6. The computer-implemented method of claim 1, wherein the plurality of geospatial data objects comprise a plurality of map tiles.

7. The computer-implemented method of claim 1, wherein the plurality of geospatial data objects comprise a plurality of street level panoramic images.

8. The computer-implemented method of claim 1, wherein selecting, by the one or more computing devices, an item of content associated with the first geographic area represented by the first geospatial data object comprises:
   identifying, by the one or more computing devices, a plurality of items of content associated with the first geographic area represented by the first geospatial data object; and
   selecting, by the one or more computing devices, a first item of content from the plurality of items of content based upon a content selection algorithm that incorporates relevance data, popularity data, and advertising partnership data.

9. The computer-implemented method of claim 1, wherein selecting, by the one or more computing devices, an item of content associated with the first geographic area represented by the first geospatial data object comprises:
   identifying by the one or more computing devices, a point of interest located within the first geographic area represented by the first geospatial data object; and
   selecting, by the one or more computing devices, an item of content associated with the point of interest.

10. The computer-implemented method of claim 9, wherein identifying, by the one or more computing devices, a point of interest located within the first geographic area represented by the first geospatial data object comprises:
    identifying, by the one or more computing devices, a plurality of points of interest located within the first geographic area represented by the first geospatial data object; and
    selecting, by the one or more computing devices, a first point of interest based upon a point of interest selection algorithm that incorporates one or more secondary signals, the selected item of content being associated with the first point of interest.

11. The computer-implemented method of claim 1, wherein promoting, by the one or more computing devices, the item of content within the geographic information system comprises incentivizing, by the one or more computing devices, a user of the geographic information system to load the item of content.

12. The computer-implemented method of claim 1, wherein promoting, by the one or more computing devices, the item of content within the geographic information system comprises suggesting, by the one or more computing devices, the item of content to a user of the geographic information system.

13. A system for promoting content, the system comprising:
    one or more host servers operable to host a geographic information system, the one or more host servers each having at least one memory, at least one processor, and at least one network interface, the geographic information system comprising a plurality of geospatial data objects respectively representing a plurality of geographic areas;

wherein the one or more host servers are configured to perform operations, the operations comprising:
providing access to the plurality of geospatial data objects, via the at least one network interface, to one or more client devices;
identifying a first geospatial data object experiencing an increased volume of access; and
promoting an item of content within the geographic information system, the item of content being associated with a first geographic area represented by the first geospatial data object.

14. The system of claim 13, wherein identifying a first geospatial data object experiencing an increased volume of access comprises applying a statistical measure to access data associated with the first geospatial data object to identify an increased volume of access, the access data describing the number of instances in which the host server provides access to the first geospatial data object to the one or more client devices.

15. The system of claim 13, wherein identifying a first geospatial data object experiencing an increased volume of access comprises:
monitoring, for a plurality of periods, the number of instances in which each of the plurality of geospatial data objects is accessed by the one or more client devices; and
identifying a first period that exhibits a larger number, with respect to selected other periods of the plurality of periods, of instances in which the first geospatial data object is accessed.

16. The system of claim 13, wherein identifying a first geospatial data object experiencing an increased volume of access comprises:
measuring, for each of the plurality of geospatial data objects, a volume of access versus time;
monitoring, for each of the plurality of geospatial data objects, a derivative of the volume of access with respect to time; and
identifying a first geospatial data object having a derivative exhibiting a positive value exceeding a threshold value.

17. The system of claim 13, wherein the host server is configured to perform further operations comprising selecting the item of content from a plurality of items of content based upon a content selection algorithm that incorporates relevance data, popularity data, and advertising partnership data.

18. The system of claim 17, wherein selecting the item of content comprises:
identifying a point of interest located within the first geographic area represented by the first geospatial data object; and
selecting an item of content associated with the point of interest based upon the content selection algorithm that incorporates relevance data, popularity data, and advertising partnership data.

19. The system of claim 18, wherein identifying a point of interest located within the first geographic area represented by the first geospatial data object comprises:
identifying a plurality of points of interest located within the first geographic area represented by the first geospatial data object; and
selecting a first point of interest based upon a point of interest selection algorithm that incorporates one or more secondary signals, the selected item of content being associated with the first point of interest.

20. A non-transitory machine readable medium storing instructions that, when executed by one or more computing devices, cause the one or more computing devices to perform operations comprising:
monitoring the number of instances in which each of a plurality of geospatial data objects included in a geographic information system is downloaded by one or more client devices, each of the plurality of geospatial data objects respectively representing one of a plurality of defined geographic areas;
identifying a first geospatial data object experiencing an abnormally large number of downloads; and
increasing the visibility, within the geographic information system, of content associated with the first geospatial data object.

21. The non-transitory machine readable medium of claim 20 wherein:
the number of instances in which each geospatial data object is downloaded by the one or more client devices is monitored for a plurality of sequential periods; and
identifying a first geospatial data object experiencing an abnormally large number of downloads comprises:
evaluating a percent change, for each period with respect to a previous sequential period, in the number of instances in which each geospatial data object is downloaded by the one or more client devices; and
identifying a first period exhibiting a percent change, with respect to downloads of a first geospatial data object, that is greater than a threshold value.

22. The non-transitory machine readable medium of claim 20 wherein:
monitoring the number of instances in which each geospatial data object is downloaded by one or more client devices comprises monitoring a plurality of derivatives respectively associated with the plurality of geospatial data objects, the plurality of derivatives respectively describing the change in the number of downloads of each geospatial data object by the one or more client devices over time; and
identifying a first geospatial data object experiencing an abnormally large number of downloads comprises identifying a first derivative describing an abnormally large increase in downloads of a first geospatial data object over time.

* * * * *